Patented Mar. 21, 1950

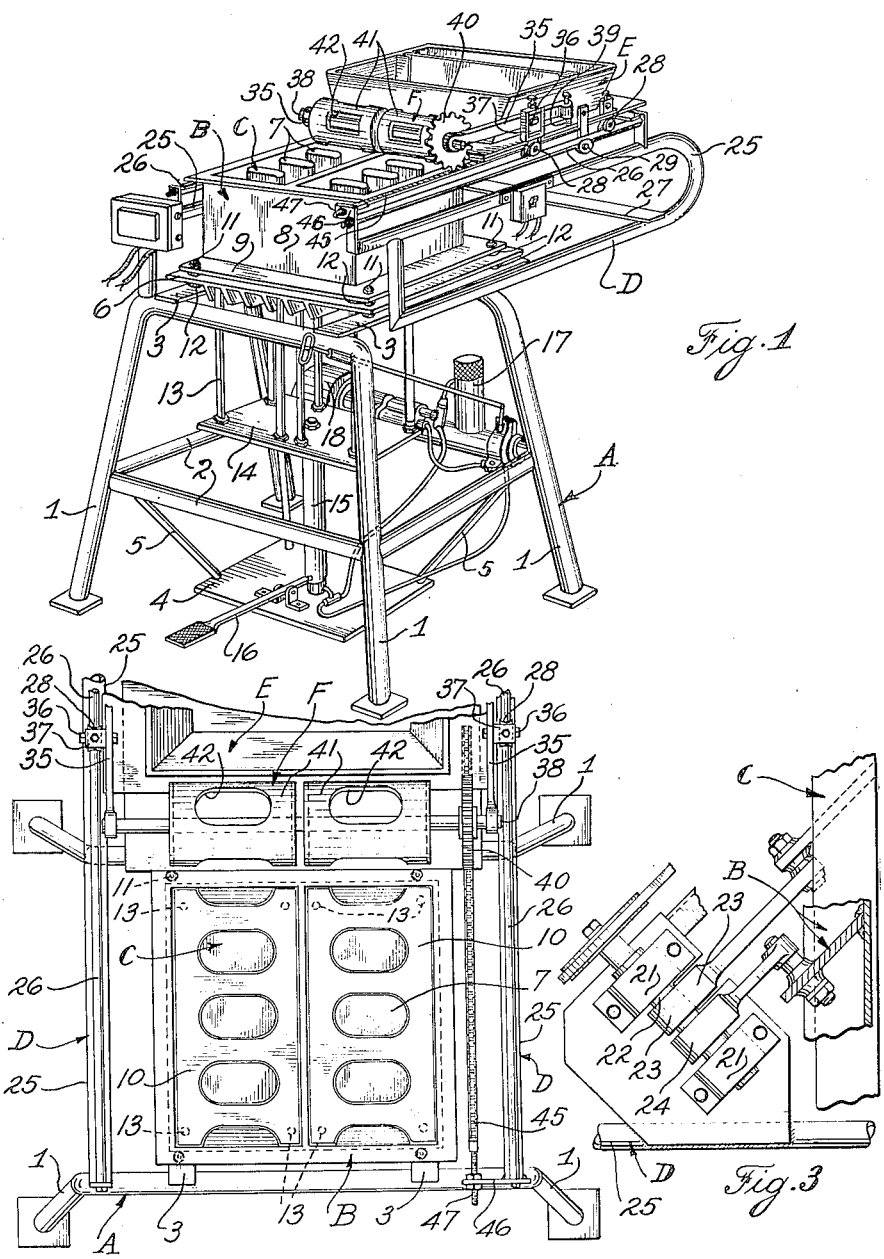

2,501,136

UNITED STATES PATENT OFFICE 2,501,136

MACHINE FOR MOLDING CONCRETE AND THE LIKE

Leslie C. Miller, Macedonia, Ohio

Application March 6, 1948, Serial No. 13,448

3 Claims. (Cl. 25—41)

1

This invention relates generally to the art of molding aggregate articles and more particularly to a new apparatus for molding light-weight concrete aggregate articles of unusually high strength.

Aggregate articles such, for example, as molded concrete blocks, must meet certain physical specifications laid down by municipalities. One of these specifications is that the block must not break when subjected to compression loads of between 750 pounds per square inch and 1000 pounds per square inch. Agregate mixtures for making molded articles, for example, concrete building blocks are mixed with water preparatory to molding and are then compacted in a mold after which they are removed from the mold and permitted to cure.

In order to meet these compressive strength requirements, block makers have resorted to various expedients. One such expedient was to use increased amounts of water in the mixture for the strength of the finished block increases in proportion to its density and the density increases as the water content increases. Such blocks had the disadvantage of undue weight. Another of such expedients involved vertical vibration of the block and mold while pressure was applied to the top of the block. This procedure required heavy complicated machinery and additional time, both of which were expensive. So far as I am aware, none of these or other proposals has been entirely satisfactory in making blocks which would meet the strength requirements without increasing the weight. The present invention makes it possible to produce concrete aggregate blocks having compressive strengths of 1500 pounds p. s. i. or more with weights which are only a few pounds per block greater than the prior art blocks which have compressive strengths of between 750 and 1000 pounds p. s. i.

The present operation may be briefly described as comprising the steps of molding into a block aggregate mixture which contains only enough water to produce a block which, in cured condition, has a compressive strength of between 750 and 1000 pounds p. s. i.; and applying progressively to the top surface of the block in the mold a pressure which is high per unit of area. The present apparatus invention contemplates simple inexpensive apparatus for carrying out this new process and particularly for applying such pressure, which apparatus may also agitate and tamp the mixture in the mold to substantially uniform density preparatory to application of that pressure.

2

The present invention will be better understood by those skilled in the art by reference to the drawings which accompany and form a part of this specification and in which:

Fig. 1 is a perspective view of one form of apparatus embodying the present apparatus invention and adapted to carry out the present method invention;

Fig. 2 is a fragmentary top plan view of the apparatus of Fig. 1; and

Fig. 3 shows the apparatus for reciprocating the mold and core parts.

The molding apparatus shown in the drawings comprises a frame A on the top of which is mounted a mold unit including mold box B and cores C. A frame D is also supported on the top of frame A and in turn carries a hopper E and a pressure-applying unit F.

As will be clear from Figs. 1 and 2, the mold box B has a lengthwise partition which provides two mold cavities each cavity having a set of cores and a pressure roller. Obviously a single cavity mold may be used instead if desired.

Frame A, as shown, consists of two U-shaped pipes 1 connected by horizontal pipes 2 to provide a rectangular structure. The tops of members 1 are also connected by plates 3. A platform 4 is supported from frame A by downwardly extending rods 5 and carries block ejecting apparatus presently to be described.

The mold unit comprises a horizontal plate 6 to which some or all of the cores 7 may be attached, a mold box 8 having an outstanding horizontal flange 9, and a pallet 10 movable upwardly around and between the cores in mold box 8 by which the molded articles may be ejected from the mold. Four bolts 11 extend vertically up through plates 3 and through the corner portions of plate 6 and flange 9. Resilient supports, such as rubber blocks 12, encircle the bolts between plates 3 and 6 and between plate 6 and flange 9 respectively, so that the mold box 8 and the core-carrying plate 6 may move relative to each other to a limited extent. When there are three cores per mold it is often desirable to anchor the middle core while permitting the cores on opposite sides thereof to move relative to it and to the mold box and to that end the middle core may be supported by a centrally disposed plate connected at its ends to plates 3 and to the lower end of the middle core.

The pallet 10 is engaged on its under surface by the upper ends of a plurality of rods 13 which are affixed to a vertically movable platform 14. This platform is connected to a tube 15 and to a piston therewithin (not shown). Foot pedal 16 may move tube 15 vertically and with its rods 13 and pallet 10, or this lifting movement may be initiated and completed by fluid pressure supplied thereto from reservoir 17 by pump 18. It will be understood that vertical movement of the pallet 10 will eject a molded article from the mold.

Mounted on the frame A near one rear corner thereof is means for reciprocating the mold 8 and the core-carrying plate 9. This means comprises a pair of bearings 21 affixed to the frame, a crankshaft 22 rotatably mounted in those bearings and connected to a motor (not shown) for driving motion and two connecting rods 23 and 24 joining cranks of the crankshaft with the mold 8 and the core-carrying plate 9 respectively. The connecting rods extend in a direction generally diagonally of the mold box and, when the crankshaft is rotated, these connecting rods reciprocate the mold box and cores in a horizontal plane and oppositely, i. e., one of these parts is moved in one direction while the other part is moved in the opposite direction.

The frame D comprises two generally D-shaped tubular members 25 and a tube 26 secured to the upper branch of this frame and extending parallel to it. Each frame D is secured to frame 1 on opposite sides of the mold unit and the two frames are connected together by bar 27 at the rear of the mold unit. The hopper E is provided on each side with two rollers 28 to run on the top of tube 26 and two rollers to run against the under side of that tube. In this manner the hopper E is supported by rollers on its tracks 26 and cannot be dislodged from its track.

The roller unit F comprises a pair of lever arms 35 pivotally mounted on pivots 36 carried by brackets 37, which also carry a pair of the rollers 28. At its forward end each lever 35 rotatably carries a shaft 38 and at its opposite end is provided with an adjustable spring 39 to bear on the flange of the hopper F.

Shaft 38, which may be a tube in certain cases, has secured thereto, as by welding, bearings 39 mounted in the forward ends of levers 35, a sprocket 40 adjacent to one of these bearings and two hollow cylindrical rollers 41 between the bearings. Each of these rollers 41 has a plurality of openings 42 through its outer peripheral wall to accommodate the cores 7 and these openings are of such size that the rollers may roll over the surface of and compress an aggregate mixture within the mold body and about the cores while permitting the cores to extend upwardly through the holes therein. When shaft 38 is a pipe, it may be provided within rollers 41 with a plurality of small holes, for example, about $\frac{1}{16}$ inch in diameter through which water may be sprayed or discharged when the apparatus is in operation. A source of water under pressure is attached to one end of shaft 38 in such a manner as to permit free rotation of the pipe as, for example, by a swivel connection (not shown).

A sprocket chain 45 is fastened at one end to bracket 46 carried by the forward end of frame D and at its other end to a corresponding bracket (not shown) also affixed to frame D. This sprocket chain is engaged by sprocket wheel 40. Chain 45 may be shifted endwise as by adjusting nuts 47 at each end thereof so as to time the rollers 41 with respect to the cores so that the rollers may roll freely over the mold with the openings 42 therein receiving their respective cores without fouling engagement.

By varying the pressure exerted on springs 39, varying pressures may be exerted by the rollers on a molded block pressure so applied by the rollers may range over several hundred pounds. Since the rollers engage the top surface of the aggregate only along an area which is short circumferentially of the rollers, the high pressure exerted by the springs becomes a high pressure per square inch of aggregate surface. Also, since the rollers are rotating when applying that pressure, the compacting action on the mixture is considerably higher than if the pressure were applied by a fixed member.

The illustrated apparatus operates substantially as follows: With the mold, cores and pallet in place and ready for molding, the hopper E is moved forwardly to a position over the mold and its forward movement carries rollers 41 to a position in advance of the mold. A relatively dry aggregate mixture is fed into and fills the mold. During this filling operation the crankshaft 22 is rotated at high speed, for example 1700 R. P. M. and the mold and movable cores are thereby reciprocated relatively with resultant agitating and tamping of the mixture between the opposed surfaces of the mold box and the cores. When the mold has been filled and the mixture has been agitated and tamped to the desired extent, which is usually accomplished in less than a minute, the rotation of the crankshaft is stopped and the hopper is retracted toward the back of the device. When this retracting operation begins, water may be supplied to the pipe 38 to spray into the rollers and into the mixture if desired. As the hopper moves rearwardly the rollers 41 are rotated by reason of sprocket 40 running on chain 45, and the peripheral surfaces of these rollers are pressed down onto the aggregate mixture in the mold and around the cores with a pressure determined by the adjustment of springs 39. An amount of pressure which has been found to give good results is that pressure which will force the aggregate mixture down in the mold to the extent of about $\frac{1}{8}$ of an inch.

When the hopper reaches its rearmost position and rollers 41 are clear of the top of the mold, the motion of the hopper is stopped, the foot pedal 16 is pressed downwardly and the pallet is moved upwardly carrying the molded article to a place above the mold body from which it may be removed for curing.

As has been indicated hereinabove, the present invention contemplates the use of an aggregate mixture which is relatively dry, i. e., one which does not contain such an amount of moisture as would be required for complete hardening action of the ingredients in the mixture which cause setting and hardening of the mixture, for example, cement or ingredients thereof in concrete aggregates. Such a mixture would ordinarily not result in a block which would meet the specifications, particularly compressive strength requirements, and would therefore be unacceptable to the trade even though it would possess the desirable characteristic of light weight. By applying such high roller pressure to such a dry mixture, I compact the aggregate mixture somewhat thereby increasing its density a little as reflected in a weight increase of a very few pounds per block and bring the particles into closer contact with resultant high compressive strengths.

It will be obvious that the foregoing process can be carried out by applying the compressive force by a hand roller or by a member which progressively applies compressive force to successive narrow areas of the top surface of the aggregate mixture in the mold.

Rollers 41 may have their block engaging surfaces configured to form different desired depressions in the top of the blocks. For example, a semi-cylindrical body attached to the outer cylindrical surface of the roller will form a semi-cylindrical indentation in the block, and two blocks assembled with such indentations opposed will provide a space for a reinforcing cylindrical rod or the like.

As the drawings indicate, the illustrated apparatus is light in weight and not expensive to build. Since the block is compacted initially by horizontal agitation and tamping and is at rest when finally compressed by pressure applied to the top thereof, no apparatus is required to lift the mold and block. Since the top pressure is applied to only a small area at any time no heavy or strong apparatus is required to apply it.

Many obvious variations of the above described apparatus may be made by those skilled in the art without departing from the spirit of the invention and all such variations are intended to be included in the scope of the appended claims.

Having thus described the present invention so that others skilled in the art may be able to understand and practice the same, I state that what I desire to secure by Letters Patent is defined in what is claimed.

What is claimed is:

1. A machine for molding moist aggregate articles comprising a vertical mold box, vertical cores within the box, means connected to the mold for positively reciprocating it diagonally in a horizontal plane to compact moist aggregate against its walls, a hollow roller having apertures to receive said cores when rolled over the mold box, means to roll said roller over the mold, and adjustable means for pressing the roller onto the top surface of the compacted mixture while the roller is rolling thereover.

2. A machine for molding moist aggregate articles comprising a vertical mold box, vertical cores within the box, means connected to the mold for positively reciprocating it diagonally in a horizontal plane to compact moist aggregate against its walls, a hollow roller having apertures to receive said cores when rolled over the mold box, means to roll said roller over the mold and spring means pressing said roller down onto the top surface of an aggregate mixture in the mold with positive pressure.

3. A machine for molding moist aggregate articles comprising a vertical mold box, vertical cores within the box, means for reciprocating said mold box and cores diagonally, horizontally and opposite to each other to compact moist aggregate in said box and about said cores, a hollow roller having apertures to receive said cores when rolled over the mold box, and means to roll said roller over the mold and exert positive downward pressure on the top surface of aggregate in the mold which has been compacted by said reciprocation of the box and cores.

LESLIE C. MILLER.

REFERENCES CITED

The following references are of record in the file of this patent:

UNITED STATES PATENTS

| Number | Name | Date |
|---|---|---|
| 934,395 | Diefendorf | Sept. 14, 1909 |
| 1,100,562 | Heller | June 16, 1914 |
| 1,398,898 | Hoenemann | Nov. 29, 1921 |
| 1,632,317 | Schlegel | June 14, 1927 |
| 1,913,455 | Preston | June 13, 1933 |
| 2,296,453 | Saffert | Sept. 22, 1942 |
| 2,301,501 | Appley | Nov. 10, 1942 |
| 2,341,012 | Billman et al. | Feb. 8, 1944 |